US011734845B2

(12) United States Patent
Guizilini et al.

(10) Patent No.: US 11,734,845 B2
(45) Date of Patent: Aug. 22, 2023

(54) SYSTEM AND METHOD FOR SELF-SUPERVISED MONOCULAR GROUND-PLANE EXTRACTION

(71) Applicant: TOYOTA RESEARCH INSTITUTE, INC., Los Altos, CA (US)

(72) Inventors: Vitor Guizilini, Santa Clara, CA (US); Rares A. Ambrus, Santa Clara, CA (US); Adrien David Gaidon, San Francisco, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 187 days.

(21) Appl. No.: 16/913,238

(22) Filed: Jun. 26, 2020

(65) Prior Publication Data

US 2021/0407117 A1    Dec. 30, 2021

(51) Int. Cl.
| | |
|---|---|
| *G06T 17/05* | (2011.01) |
| *G06T 7/521* | (2017.01) |
| *G06T 17/10* | (2006.01) |
| *G06N 3/08* | (2023.01) |
| *B60W 60/00* | (2020.01) |

(52) U.S. Cl.
CPC ........... *G06T 7/521* (2017.01); *B60W 60/001* (2020.02); *G06N 3/08* (2013.01); *G06T 17/05* (2013.01); *G06T 17/10* (2013.01); *B60W 2420/52* (2013.01)

(58) Field of Classification Search
CPC ...... G06T 7/50–77; G06T 17/00; G06T 17/05
See application file for complete search history.

(56) References Cited

U.S. PATENT DOCUMENTS

| | | | |
|---|---|---|---|
| 10,444,398 B2 | 10/2019 | Muensterer et al. | |
| 2011/0216213 A1* | 9/2011 | Kawahata | G06T 7/194 |
| | | | 348/222.1 |
| 2021/0144357 A1* | 5/2021 | Kim | H04N 13/271 |
| 2021/0352262 A1* | 11/2021 | Buslaev | G06T 7/80 |

FOREIGN PATENT DOCUMENTS

| | | |
|---|---|---|
| CN | 110689008 A | 9/2019 |
| KR | 20190124113 A | 11/2019 |

OTHER PUBLICATIONS

Zhan, et al., "Self-Supervised Learning for Single View Depth and Surface Normal Estimation", arXiv:1903.00112v1, Mar. 1, 2019, pp. 1-7.

Man, et al., "Groundnet: Monocular Ground Plane Normal Estimation With Geometric Consistency", arXiv:1811.07222v4, Aug. 10, 2020, pp. 1-11.

* cited by examiner

*Primary Examiner* — Ryan McCulley
(74) *Attorney, Agent, or Firm* — Seyfarth Shaw LLP

(57) ABSTRACT

Systems and methods for extracting ground plane information directly from monocular images using self-supervised depth networks are disclosed. Self-supervised depth networks are used to generate a three-dimensional reconstruction of observed structures. From this reconstruction the system may generate surface normals. The surface normals can be calculated directly from depth maps in a way that is much less computationally expensive and accurate than surface normals extraction from standard LiDAR data. Surface normals facing substantially the same direction and facing upwards may be determined to reflect a ground plane.

20 Claims, 3 Drawing Sheets

SYSTEM AND METHOD FOR SELF-SUPERVISED MONOCULAR GROUND-PLANE EXTRACTION

FIELD OF TECHNOLOGY

The present disclosure relates to improving machine vision and learning, and more particularly, to extracting ground plane information from monocular images.

BACKGROUND

Machine learning provides a basis for the design, programming and operation of autonomous vehicles. Autonomous and semi-autonomous vehicles may be trained according to environmental and situational data allowing the vehicle to operate and navigate known and unknown trajectories. Sensors installed and configured on an ego vehicle, i.e., an autonomous or semi-autonomous vehicle, provide environmental data to a machine learning system. Monocular cameras can be a cost-effective approach when compared to more complex imaging systems including LiDAR, stereo cameras or the like, however the sensor data from monocular cameras does not explicitly include depth information. Instead, the vehicle implements processing routines that derive depth information from the monocular images.

One of the challenges in machine learning is perceiving the three-dimensional depth of an environment through the capture of two-dimensional images. In mapping a three-dimensional environment for a vehicle, for example, a depth system must be able to distinguish a roadway or ground surface from other objects and structures rising from the ground surface. Traditional depth systems rely on images from multiple cameras or LiDAR systems to generate depth maps and extract ground plane information to assist vehicle navigation. Such systems require additional hardware, i.e., multiple cameras, or expensive and complex resources, i.e., LiDAR, to be able to extract three-dimensional data, including ground planes, from captured images.

SUMMARY

Aspects of the present disclosure provide for systems and methods for extracting ground plane information directly from monocular images using self-supervised depth networks. The self-supervised depth networks are used to generate a three-dimensional reconstruction of the observed structures. From this reconstruction the system may generate surface normals, which are vectors perpendicular to the direction or surfaces at each location. The surface normals can be calculated directly from depth maps in a way that is much less computationally expensive and accurate than surface normals extraction from standard LiDAR data. Surface normals facing substantially the same direction and facing upwards may be determined to reflect a ground plane.

According to one aspect of the present disclosure, a system for generating a ground plane of an environment is provided. The system may include one or more processors and a memory communicably coupled to the one or more processors. A depth system may include instructions that when executed by the one or more processors cause the one or more processors to, in response to, to generate a depth map. The depth map may be generated by receiving at least one monocular image and processing the at least one monocular image according to a depth model. An image module may include instructions that when executed by the one or more processors cause the one or more processors to define in the depth map a plurality of polygons, and for each polygon, generate a surface normal. A ground plane may be extracted from the surface normal for each polygon.

According to another aspect of the disclosure, a method for generating a ground plane of an environment is provided. At least one monocular image may be received and a depth map may be generated by processing the at least one monocular image according to a depth model. A plurality of polygons may be defined in the depth map and, for each polygon, a surface normal may be generated. A ground plane may be extracted from the surface normal for each polygon.

According to another aspect, a non-transitory computer-readable medium for generating a ground plane for an environment is provided, including instructions that when executed by one or more processors cause the one or more processors to receive at least one monocular image and generate a depth map by processing the at least one monocular image according to a depth model. A depth map may define a plurality of polygons and for each polygon, a surface normal may be generated. A ground plane may be extracted from the surface normal for each polygon.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. It will be apparent to those skilled in the art, however, that these concepts may be practiced without these specific details. In some instances, well-known structures and components are shown in block diagram form in order to avoid obscuring such concepts.

Aspects of the present disclosure provide for systems and methods for ground-plane extraction directly from monocular images using self-supervised depth networks. The self-supervised depth networks may be used to generate a three-dimensional reconstruction of observed structures in an environment surrounding, for example, a vehicle. From this reconstruction, the system may generate surface normals, which are vectors perpendicular to the direction or surfaces at each location. The surface normals may be calculated directly from depth maps, a structured two-dimensional re-projected version of a three-dimensional point cloud representing the observed structures, in a way that is computationally less expensive and more accurate than surface normals extraction from standard LiDAR data due to the less dense, or sparser, nature of LiDAR data. According to one aspect, surface normals corresponding to the road may be isolated, and by doing so, the system may accurately segment the ground-plane from the remaining point cloud. While a single ground plane may be sufficient for many applications, aspects of the present disclosure allow for the extraction of multiple planes, which may be useful in the case of irregular or hilly roads. In the extreme case, individual ground tiles may be estimated, generating a height map representing the terrain of the entire observed environment.

Figure 1:
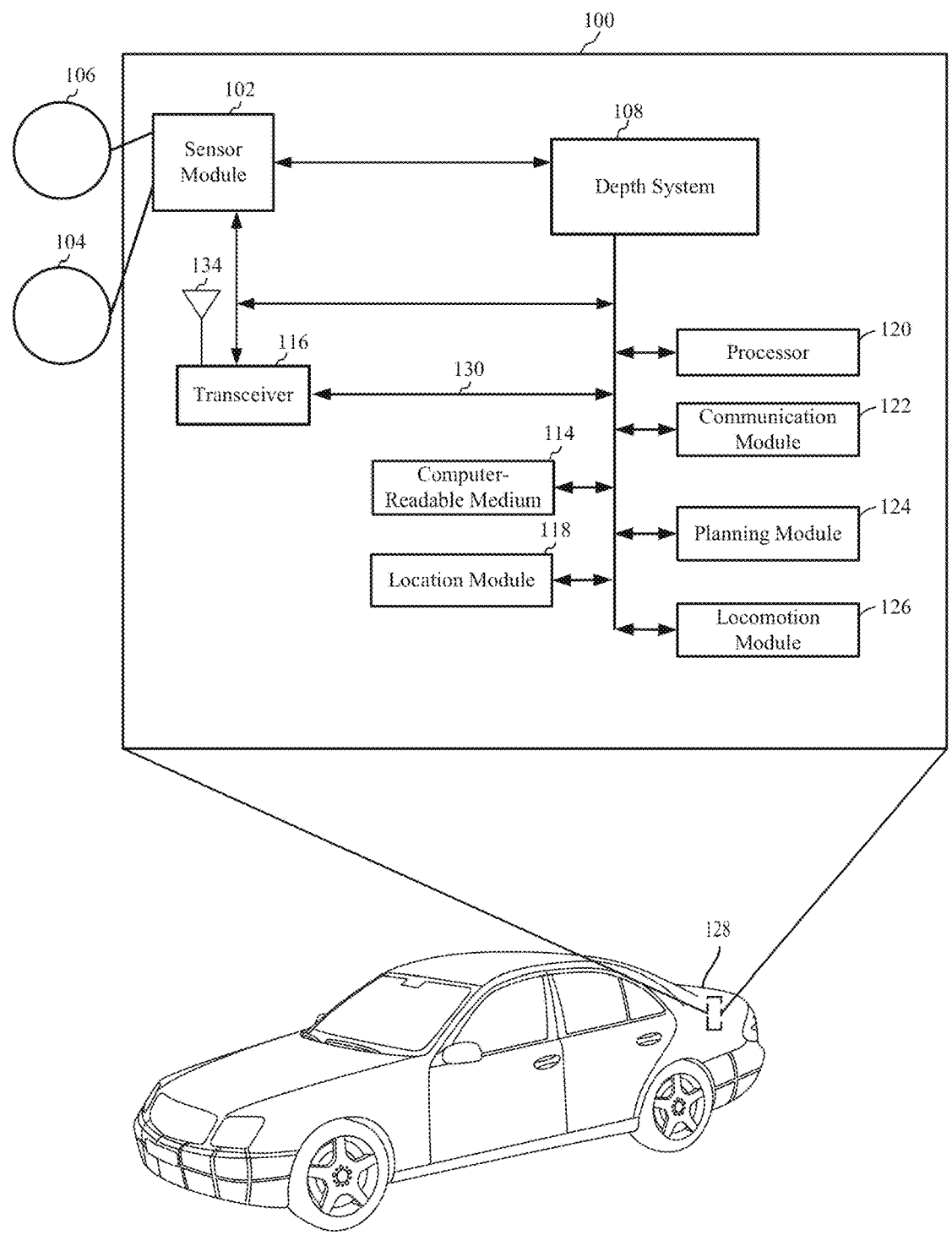
FIG. 1 is a diagram of a vehicle system according to one aspect of the present disclosure.

FIG. 1 is a diagram illustrating an example of a hardware implementation for a vehicle system 100, according to aspects of the present disclosure. The vehicle system 100 may be part of a passenger vehicle, a carrier vehicle, or other device. For example, as shown in FIG. 1, the vehicle system 100 may be a component of a component of an autonomous or semi-autonomous car 128. Aspects of the present disclosure are not limited to the vehicle system 100 being a component of the car 128, as other devices, including autonomous and semi-autonomous vehicles and other devices are also contemplated for using the vehicle system 100.

The vehicle system 100 may be implemented with a bus architecture, represented generally by a bus 130. The bus 130 may include any number of interconnecting buses and bridges depending on the specific application of the vehicle system 100 and the overall design constraints. The bus 130 may link together various circuits including one or more processors and/or hardware modules, represented by a processor 120, a communication module 122, a location module 118, a sensor module 102, a locomotion module 126, a planning module 124, and a computer-readable medium 114. The bus 130 may also link various other circuits such as timing sources, peripherals, voltage regulators, and power management circuits, which are well known in the art, and therefore, will not be described any further.

The vehicle system 100 may include a transceiver 116 coupled to the processor 120, the sensor module 102, a depth system 108, the communication module 122, the location module 118, the locomotion module 126, the planning module 124, and the computer-readable medium 114. The transceiver 116 is coupled to an antenna 134. The transceiver 116 communicates with various other devices over a transmission medium. For example, the transceiver 116 may send and receive commands via transmissions to and from a server or a remote device, such as remote device or server (not shown).

The depth system 108 may include the processor 120 coupled to the computer-readable medium 114. The processor 120 may perform processing, including the execution of software stored on the computer-readable medium 114 providing functionality according to the disclosure. The software, when executed by the processor 120, causes the vehicle system 100 to perform the various functions described for a particular device, such as car 128, or any of the modules 102, 108, 114, 116, 118, 120, 122, 124, 126. The computer-readable medium 114 may also be used for storing data that is manipulated by the processor 120 when executing the software.

The sensor module 102 may be used to obtain measurements via different sensors, such as a first sensor 104, a second sensor 106. The first sensor 104 may be a motion sensor, such as an accelerometer, gyroscope, inertial measurement unit, or the like. The second sensor 106 may include a visual sensor, such as a monocular camera, stereoscopic camera, a red-green-blue (RGB) camera, LIDAR or RADAR. Of course, aspects of the present disclosure are not limited to the aforementioned sensors as other types of sensors, such as, for example, thermal, sonar, and/or lasers are also contemplated for either of the sensors 104, 106. The measurements of the sensors 104, 106 may be processed by one or more of the processor 120, the sensor module 102, the depth system 108, the communication module 122, the location module 118, the locomotion module 126, the planning module 124, in conjunction with the computer-readable medium 114 to implement the functionality described herein. In one configuration, the data captured by the first sensor 104 and the second sensor 106, may be transmitted to an external device via the transceiver 116. The sensors 104, 106 may be coupled to the car 128 or may be in communication with the car 128.

The location module 118 may be used to determine a location of the car 128. For example, the location module 118 may use a global positioning system (GPS) to determine the location of the car 128. For example, the vehicle system 100 may be able to communicate with a remote monitoring service, such as mapping/navigation service, a weather service, or other environmental information provider.

The communication module 122 may be used to facilitate communications via the transceiver 116. For example, the communication module 122 may be configured to provide communication capabilities via different wireless protocols, such as Bluetooth, Wi-Fi, long term evolution (LTE), 3G, 5G, or the like. The communications module may also be configured to establish a communication channel between the car 128 and an information provider. The communication module 122 may also be used to communicate with other components of the car 128 that are not modules of the depth system 108.

The planning module 124, as well as other modules described herein, may be software modules running in the processor 120, resident/stored in the computer-readable medium 114, one or more hardware modules coupled to the processor 120, or some combination thereof.

The depth system 108 may be in communication with the sensor module 102, the transceiver 116, the processor 120, the communication module 122, the location module 118, the locomotion module 126, the planning module 124, and the computer-readable medium 114. In one configuration, the depth system 108 may receive sensor data from the sensor module 102. The sensor module 102 may receive the sensor data from the sensors 104, 106, including images from a monocular camera. According to aspects of the disclosure, the sensor module 102 may filter the data to remove noise, encode the data, decode the data, merge the data, or perform other functions. In an alternate configuration, the depth system 108 may receive sensor data directly from the sensors 104, 106.

As shown in FIG. 1, the depth system 108 may receive image data from the sensor module 102 including, for example, image data from a monocular camera. According to one aspect the depth system 108 may function to process monocular images and provide depth estimates for an environment (e.g., objects, surfaces, etc.) depicted therein. Moreover, while depicted as a standalone component, in one or more embodiments, the depth system 108 may be integrated with the locomotion module 126, the sensor module 102, or another module of the vehicle 128. The noted functions and methods will become more apparent with a further discussion of the figures.

The depth system 108, as described herein, may include and process images according to a depth model to generate one or more depth maps of the environment captured by the sensors 104, 106. The depth model may be a self-supervised neural network that trains itself on the image data. The depth system, according to one aspect, use the depth map to generate a number of surface normals indicating vectors perpendicular to a surface perceived in the environment. As described herein, the depth map may be segmented and surface normals for each segment may be generated. The depth system may use the surface normals to identify and extract a ground plane from the depth map, indicating a horizon, a roadway, or other boundary between the ground and surrounding objects and structures.

Figure 2:
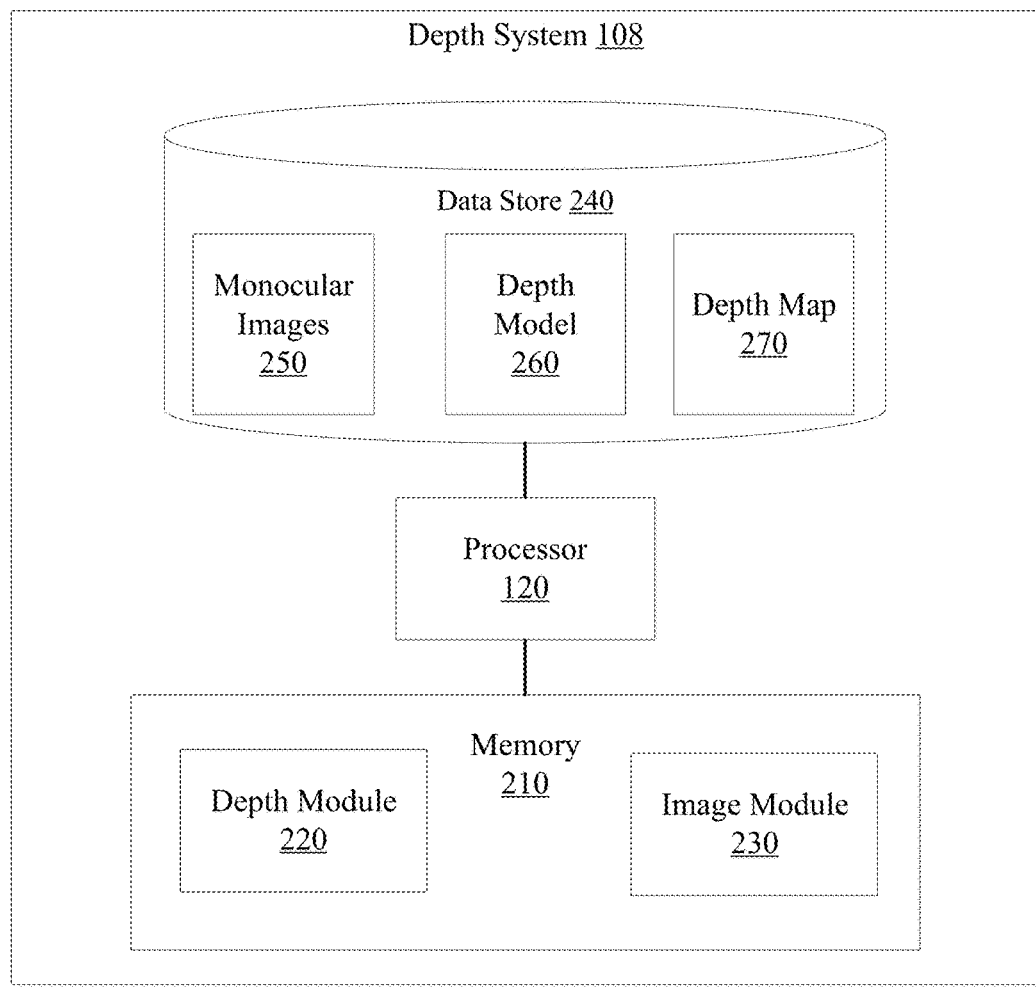
FIG. 2 is a diagram of a depth system according to one aspect of the present disclosure.

FIG. 2 depicts a diagram of a depth system 108 according to one aspect of the present disclosure. The depth system 108 may include or interface with the processor 120. Accordingly, the processor 120 may be a part of the depth system 108 or the depth system 108 may access the processor 120 through a data bus 130 (FIG. 1) or another communication path. According to at least one aspect, the processor 120 may be an application-specific integrated circuit (ASIC) that is configured to implement functions associated with a depth module 220 and an image module 230. In general, the processor 120 may be an electronic processor such as a microprocessor that is capable of performing various functions as described herein. According to one aspect, the depth system 108 may include a memory 210 that stores the depth module 220 and the image module 230. The memory 210 may be a random-access memory (RAM), read-only memory (ROM), a hard disk drive, a flash memory, or other suitable memory for storing the depth module 220 and image module 230. The depth module 220 and image module 230 may be, for example, computer-readable instructions that when executed by the processor 120 cause the processor 120 to perform the various functions disclosed herein.

The depth system 108 may include a data store 240. The data store 240 may be, according to one aspect, an electronic data structure stored in the memory 210 or another data store and may be configured with routines that can be executed by the processor 110 for analyzing stored data, providing stored data, organizing stored data, and so on. Thus, in one embodiment, the data store 240 stores data used by the depth module 220 and image module 230 in executing various functions. The data store 240 may include monocular image(s) 250, a depth model 260, and a depth map(s) 270 along with, for example, other information that is used by the depth module 220 and image module 230.

The monocular images 250 may be, for example, an image from a camera that encompasses a field-of-view about a vehicle of at least a portion of the surrounding environment. That is, the monocular images 250 may be, according to one aspect, generally limited to a subregion of the surrounding environment. As such, the monocular images 250 may be of a forward-facing (i.e., the direction of travel) 60°, 90°, 120° field-of-view, a rear/side facing field-of-view, or some other subregion as defined by the characteristics of the camera. In further aspects, the camera may be an array of two or more cameras that capture multiple images of the surrounding environment and stitch the images together to form a comprehensive 360° view of the surrounding environment.

The monocular images 250 may include visual data of the field-of-view that is encoded according to an image standard (e.g., codec) associated with the camera. In general, characteristics of the camera and the image standard may define a format of the monocular images 250. While the particular characteristics may vary according to different implementations, in general, the monocular images 250 may have a defined resolution (i.e., height and width in pixels) and format. Thus, for example, the monocular images 250 may be generally an RGB visible light image. In further aspects, the monocular images 250 may be infrared images associated with a corresponding infrared camera, a black/white image, or another suitable format as may be desired. Whichever format that the depth system 108 implements, the monocular images 250 may be a monocular in that there is no explicit additional modality indicating depth. In contrast to a stereo image that may integrate left and right images from separate cameras mounted side-by-side, the monocular images 250 may not include explicit depth information such as disparity maps derived from comparing the stereo images pixel-by-pixel.

Instead, the monocular images 250 may provide depth information implicitly in the relationships of perspective and size of elements depicted in the monocular images 250 from which the depth module 220 derives the depth map 270 by using the depth model 260. The depth map 270, according to one aspect, may be a data structure corresponding to the monocular images 250 that indicate distances or depths to objects and features represented in the monocular images 250.

The depth module 220 generally may employ the depth model 260 to produce the depth map 270 as an inverse mapping having inverse values for the depth estimates. That is, instead of providing plain depth data, the depth module 220 may implement the depth model 260 to provide the depth estimates in an inverse form. Thus, depth module 220 may subsequently invert the values of the depth map 270 to provide the depth values or the image module 230 may separately invert the depth map 270 to generate depth estimates. Moreover, the depth module 220 may also selectively output the depth map 270 from the depth model 260 at different points in processing in order to provide the depth map 270 at different scales.

The depth module 220 may provide, for example, the depth map 270 at the different scales separately to different systems in the car 128 via the image module 230. That is, separate systems may function on finer or coarser resolutions of depth information depending on a particular task that is undertaken. Accordingly, the depth module 220 can separately provide the different scales to the various systems and/or omit subsequent processing where a fuller resolution form of the depth map 270 is not required. As such, the depth module 220 generally provides a robust implementation for resolving depth estimates that can be adapted to different systems.

According to one aspect, the image module 230 generally may include instructions that function to control the processor 120 to execute various actions in support of the depth module 220. For example, the image module 230 may receive the monocular images 250 from the camera and provide the monocular images 250 to the depth module 220. The image module 230 may receive the monocular images 250 by controlling the camera to capture the monocular images 250, by passively acquiring the monocular images 250 from a data bus or electronic memory, or the like. The image module 230 may also perform pre-processing on the monocular images 250 to provide the monocular images 250 in a format that is accepted by the depth model 260.

According to one aspect, the image module 230 may handle outputs from the depth module 220 and depth model 260. The image module 230 may include instructions to, for example, perform one or more post-processing routines, including extracting a ground plane, providing the depth map 270 to additional systems/modules in the car 128 in order to control the operation of the modules and/or the car 128 overall, and so on. In still further aspects, the image module 230 may communicate the depth map 270 to a remote system (e.g., cloud-based system) as, for example, a mechanism for mapping the surrounding environment or for other purposes (e.g., traffic reporting, etc.). As one example, the image module 230 may use the depth map 270 to map locations of obstacles in the surrounding environment and plan a trajectory that safely navigates the obstacles. Thus, the image module 230 may use the depth map 270 to control the car 128 to navigate through the surrounding environment.

In further aspects, the image module 230 may convey the depth map 270 to further internal systems/components of the car 128 such as the locomotion module 126. For example, the image module 230 may acquire the depth map 270 and convey the depth map 270 to the locomotion module 126 in a particular scale that the locomotion module 126 accepts as an electronic input. In this way, the depth system 170 may inform the locomotion module 126 of the depth estimates to improve situational awareness and planning of the locomotion module 126. As such, the locomotion module 126 may acquire the depth map 270 as a primary source of depth information for the surrounding environment or as a secondary source that verifies other image capture and processing capabilities (e.g., LiDAR data). It should be appreciated that the locomotion module 126 is indicated as one example, and, in further arrangements, the image module 230 may provide the depth map 270 to the locomotion module 126 and/or other components in parallel or as a separate conveyance.

According to one aspect of the present disclosure, the image module 230 includes instructions to train the depth model 260. The image module 230, may train the depth model 260 using a self-supervised structure from motion (SfM) process. Thus, to initiate the depth model 260, the image module 230 may use images from video of a scene and formulate the generation of the depth map 270 as a photometric error minimization across the images. In general, the image module 230 may train the depth model 260 by causing the depth module 220 to execute the depth model 260 as though typical operation is underway, however, the image module 230 may provide one or more images from the video as the monocular images 250 for processing.

Figure 3:
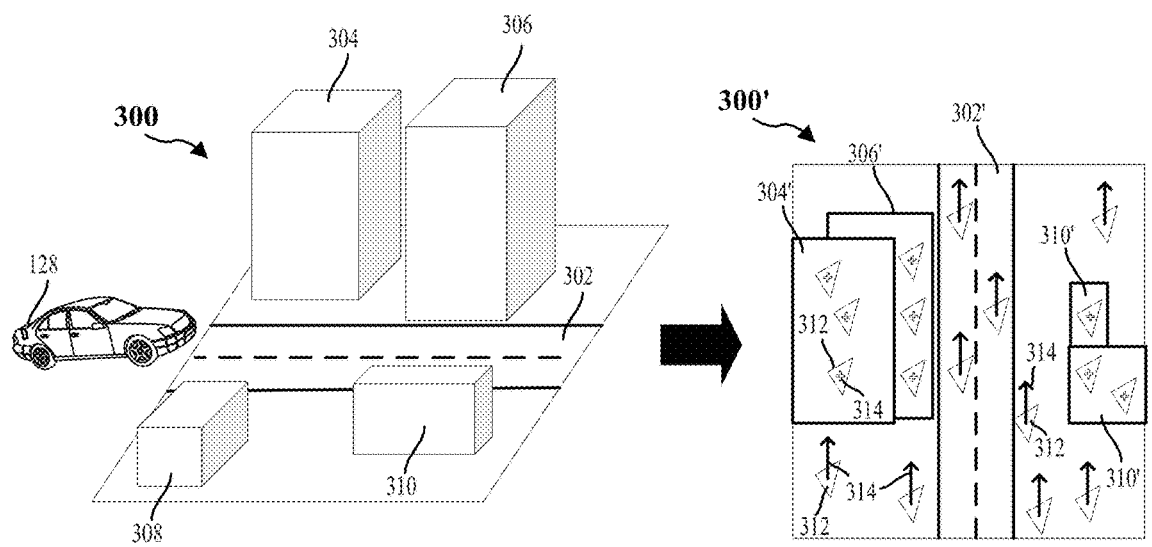
FIG. 3 is a conceptual diagram of a three-dimensional environment transformed to a depth map with calculated surface normals according to one aspect of the present disclosure.

As such, the image module 230 may use the resulting map 270 to identify and extract a ground plane from the surrounding environment via the generated depth maps. According to one aspect, the depth map 270 may reflect one or more surfaces or one or more structures perceived in the environment. FIG. 3 depicts a conceptual diagram of a three-dimensional scene 300, as perceived by a car 128, transformed to a depth map 300' with calculated surface normals 314 according to one aspect of the present disclosure.

As one example, according to an aspect of the present disclosure, the car 128 may be traveling along a roadway 302 that is surrounded by one or more structures 304, 306, 308, 310. A monocular camera on the car 128 may capture a monocular image of the scene 300 for processing by the depth system 108, as described herein. The depth system 108 may output a depth map 300' as a representative reconstruction of the scene 300. The depth map 300' may include one or more transformed structures 304', 306', 308' 310'. The depth system 108 may further segment the depth map into one or more polygons, such as triangles 312. Surface normals 314 from each triangle 312 may be generated indicating a direction perpendicular to the various surfaces on which the triangles are mapped.

Surface normals 314 may be generated from each triangle using a cross-product operation. A surface normal 314 for a triangle may be calculated by taking the vector cross product of two edges of that triangle. For example, a triangle 312 may be defined by points $p_1$, $p_2$, $p_3$, if the vector $U=p_2-p_1$ and the vector $V=p_3-p_1$ then the normal $N=U \times V$ and can be calculated by:

$$N_x = U_y V_z - U_z V_y$$

$$N_y = U_z V_x - U_x V_z$$

$$N_z = U_x V_y - U_y V_x$$

The surface normals 314 are perpendicular to the triangles 312, therefore if the surface normal vectors of neighboring triangles 312 are pointing in the same direction, it may be reasoned that the triangles 312 are part of the same surface. Further, if the ground plane is assumed to be generally horizontal, any surface normals directed straight upwards may be indicative of the ground plane, and thus, at least partially, the perceived roadway 302'. Surface normals 312 of the one or more transformed structures 304', 306', 308' 310', indicated as a '+', reflect a surface perpendicular to the camera and/or car 128.

One skilled in the art will recognize the features depicted in FIG. 3 are simplified for the purpose of explanation. That is, the entire depth map 300' may be segmented into a number of contiguous polygons, or triangles, and surface normals may be generated for each polygon. Further, one of skill in the art will recognize that the depth map 300' of FIG. 3 is simplified to reflect only two surfaces (i.e., the ground plane and a number of perpendicular structures), however aspects of the present disclosure include more complex geometries and dimensions as they may be imaged by the camera and processed by the depth system 108.

According to one aspect of the present disclosure, the calculated surface normals 314 generally pointing upwards may be indicative of the ground plane. According to one aspect, a tolerance or range of degrees of the surface normals may be implemented to account for variations in the ground surface, such as hills or other bumps. Additionally, the depth system 108 may use a similar methodology to identify multiple planes representing irregular or hilly roads. According to one aspect, a height map may be generated representing multiple planes yielding a terrain map of the entire environment.

Referring back to FIG. 2, the image module 230 may then use the depth map and ground plane data thereby training in a self-supervising manner the depth model 260 to produce improved depth estimates and ground planes without requiring semantic labeling. According to one aspect, the depth model and depth system 108 may be trained in a self-supervised manner without the input of training labels or other semantic information. Using only surface normal information from a depth map, the identification of one or more ground planes may be accomplished without any supervisory depth or semantic information. In general, the image module 230 may train the depth model 260 over a training data set of monocular video sequences that are generally comprised of many separate images. According to one aspect of the present disclosure, one aim of depth and ego-motion self-supervised training may be to learn generalizable features, such as ground plane identification, that may be used in other settings to estimate depth and egomotion from camera images.

Through this training process, the depth model 260 may develop a learned prior of the monocular images 250 as embodied by the internal parameters of the depth model 260 from the training on the images. In general, the depth model 260 develops the learned understanding about how depth relates to various aspects of an image according to, for example, size, perspective, and so on. Consequently, the resulting trained depth model 260 is leveraged by the depth system 108 to estimate depths from monocular images that do not include an explicit modality identifying the depths.

Figure 4:
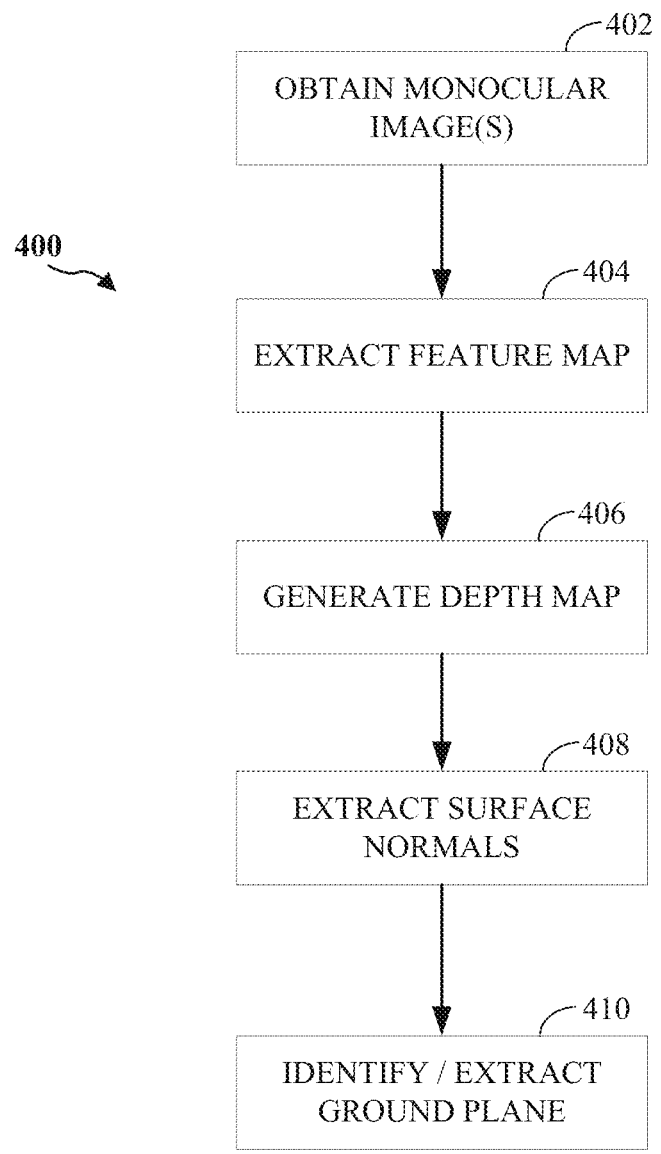
FIG. 4 depicts a method of extracting a ground plane from a surrounding environment using monocular images according to one aspect of the present disclosure.

FIG. 4 depicts a method 400 of extracting a ground plane within a surrounding environment from monocular images. As described herein, and shown in block 402, the depth system may receive one or more monocular images from an image sensor or image capture device of an environment of interest. The depth system may, as shown in block 404, extract one or more feature maps from the monocular images according to a depth model, described herein. The depth model may be, for example, a convolutional neural network in the form of an encoder/decoder architecture. The output of the convolutional neural network, including the feature maps, may be used to generate a depth map, as shown in bock 406 and described herein.

According to one aspect, as shown in block 408, the depth system may extract surface normal information from the depth map. As described herein, the surface normals may be generated from defined polygons, such as triangles, in the depth map. Surface normal vectors of neighboring polygons facing the same direction may be expected to be part of the same surface, structure or object in the original image. As shown in block 410, the surface normals may be used to extract a ground plane from the depth map. For example, assuming that the ground is substantially horizontal, a number of surface normals all facing substantially the same direction and facing straight upwards, may indicate a ground surface, from which a ground plane may be extracted. As described herein, multiple planes may be identified using similar methods to reflect a change in elevation of the ground surface, or to generate a height map representing the entire terrain of the environment.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RANI from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A system for generating a ground plane of an environment, comprising:
   one or more processors;
   a memory communicably coupled to the one or more processors and storing:
   a depth system including instructions that when executed by the one or more processors cause the one or more processors to generate a plurality of depth maps by:
      receiving at least one monocular image;
      processing the at least one monocular image according to a depth model and a first and second scale;
      output a first depth map at the first scale and a second depth map at the second scale; and
   an image module including instructions that when executed by the one or more processors cause the one or more processors to:
      define in the first and second depth maps a plurality of polygons;
      for each polygon generate a surface normal;
      extract the ground plane from the surface normal for each polygon; and
      transmit the first depth map to a first vehicle system and the second depth map to a second vehicle system.

2. The system of claim 1 wherein the plurality of polygons comprises a plurality of triangles.

3. The system of claim 2 wherein each surface normal is generated using a cross product of the triangle.

4. The system of claim 1 wherein extracting the ground plane includes identifying a plurality of surface normals facing substantially the same direction.

5. The system of claim 4 wherein substantially the same direction includes an upward direction.

6. The system of claim 1 wherein the depth model comprises a neural network.

7. The system of claim 6 wherein the neural network is self-supervised.

8. A method for generating a ground plane of an environment, comprising:
   receiving at least one monocular image;
   generating a plurality of depth maps by processing the at least one monocular image according to a depth model and a first and second scale;
   outputting a first depth map at the first scale and a second depth map at the second scale;
   defining in the first and second depth maps a plurality of polygons;
   for each polygon, generating a surface normal;
   extracting a ground plane from the surface normal for each polygon; and
   transmit the first depth map to a first vehicle system and the second depth map to a second vehicle system.

9. The method of claim 8 wherein the plurality of polygons comprises a plurality of triangles.

10. The method of claim 9 wherein each surface normal is generated using a cross product of the triangle.

11. The method of claim 9 wherein extracting the ground plane includes identifying a plurality of surface normals facing substantially the same direction.

12. The method of claim 11 wherein substantially the same direction includes an upward direction.

13. The method of claim 8 wherein the depth model comprises a neural network.

14. The method of claim 13 wherein the neural network is self-supervised.

15. A non-transitory computer-readable medium for generating a ground plane for an environment and including instructions that when executed by one or more processors cause the one or more processors to:
   receive at least one monocular image;
   generate a plurality of depth maps by processing the at least one monocular image according to a depth model and a first and second scale;
   output a first depth map at the first scale and a second depth map at the second scale;
   define in the first and second depth maps a plurality of polygons;
   for each polygon, generate a surface normal;
   extract a ground plane from the surface normal for each polygon; and
   transmit the first depth map to a first vehicle system and the second depth map to a second vehicle system.

16. The non-transitory computer-readable medium of claim 15 wherein the plurality of polygons comprises a plurality of triangles.

17. The non-transitory computer-readable medium of claim 16 wherein each surface normal is generated using a cross product of the triangle.

18. The non-transitory computer-readable medium of claim 16 wherein substantially the same direction includes an upward direction.

19. The non-transitory computer-readable medium of claim 15 wherein extracting the ground plane includes identifying a plurality of surface normals facing substantially the same direction.

20. The non-transitory computer-readable medium of claim 15 wherein the depth model comprises a self-supervised neural network.

* * * * *